United States Patent
Rohit et al.

(10) Patent No.: US 7,370,109 B1
(45) Date of Patent: May 6, 2008

(54) HIERARCHICAL MANAGEMENT OF OBJECTS

(75) Inventors: Rohit Rohit, Alwar (IN); Rajiv Raghunarayan, Mumbai (IN)

(73) Assignee: Cisco Technology, Inc., San Jose, CA (US)

( * ) Notice: Subject to any disclaimer, the term of this patent is extended or adjusted under 35 U.S.C. 154(b) by 811 days.

(21) Appl. No.: 10/189,517

(22) Filed: Jul. 8, 2002

(51) Int. Cl.
*G06F 15/16* (2006.01)

(52) U.S. Cl. .................. 709/227; 709/228; 709/234

(58) Field of Classification Search ............. 709/224, 709/223, 245, 200, 227, 228, 234
See application file for complete search history.

(56) References Cited

U.S. PATENT DOCUMENTS

| | | | |
|---|---|---|---|
| 6,567,861 B1 * | 5/2003 | Kasichainula et al. | 719/330 |
| 6,880,089 B1 * | 4/2005 | Bommareddy et al. | 726/11 |
| 2002/0133582 A1 * | 9/2002 | Shibata | 709/223 |
| 2005/0079112 A1 * | 4/2005 | Li et al. | 422/186.03 |

FOREIGN PATENT DOCUMENTS

| | | | | |
|---|---|---|---|---|
| WO | WO 02/13485 A2 * | 2/2002 | | 709/227 |

OTHER PUBLICATIONS

RFC 2273 to Levi et al, SNMP Applications, Apr. 1999 pp. 20-30.*
SNMPv3 Working Group; Harrington, Presuhn & Wijnen; Entitled:"Request for Comments 2571-An Architecture for Describing SNMP Management Frameworks"; Apr. 1999; Available from http://www.ietf.org/rfc/rfc2571.txt; (62 pages).
Levi, et al.; Entitled:"Request for Comments 2573- SNMP Applications"; Apr. 1999; Available from http://www.ietf.org/rfc/rfc2573.txt; (72 pages).
Case, Fedor, Schoffstall, & Davin; Entitled:"Request for Comments 1067- A Simple Network Management Protocol"; Aug. 1988; Available from http://www.ietf.org/rfc/rfc1067.txt; (33 pages).

* cited by examiner

*Primary Examiner*—William Vaughn
*Assistant Examiner*—Djenane Bayard
(74) *Attorney, Agent, or Firm*—Narendra Reddy Thappeta

(57) ABSTRACT

A networking environment in which a sequence of proxy forwarders are used to forward network management requests from a network management station (NMS) to a network element containing a managed object. The NMS sends a request according to a network management protocol. The sequence of proxy forwarders forward the request to the network element. The response generated by the network element is forwarded back to the NMS by the same sequence of proxy forwarders, but in the reverse direction.

37 Claims, 6 Drawing Sheets

HIERARCHICAL MANAGEMENT OF OBJECTS

BACKGROUND OF THE INVENTION

1. Field of the Invention

The present invention relates to network management, and more specifically to a method and apparatus for hierarchical management of objects in a networking environment.

2. Related Art

A networking environment generally contains devices such as computer systems, servers, etc., which may be connected by a network. Networks in turn contain devices such as routers, bridges and access servers. There has been felt a general need to enable a network administrator to manage (e.g., monitor, configure) such devices ("network elements").

Network management protocols have accordingly been defined which enable a network administrator to manage network elements from a network management station (NMS). Typical network protocols enable different entities (e.g., interfaces, routing tables) within each network element to be managed from a NMS, and the entities are generally referred to as managed objects.

Typical management transactions from a NMS entail sending a request to a managed object (network element), and generally receiving a response. Simple network management protocol (SNMP) is an example of a network management protocol which is implemented according to such an approach. Thus, it may be desirable for a NMS to send requests directly to a managed object (or a network element containing the object), and for the object to send back a response.

Unfortunately, such a communication may not be always possible due to various reasons (e.g., the NMS and the agent may be operating with different versions of SNMP). Accordingly, devices known as proxy forwarders have been proposed which forward requests received from a NMS to the corresponding device (intended recipient), and then forward a resulting response received from the device to the NMS. Proxy forwarders are described in further detail in RFC 2573, available at www.ietf.org, and is incorporated in its entirety herewith into the present application.

In general, it is desirable that a NMS be able to manage many devices in a networking environment.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention enables a network management station (NMS) to manage an object ("managed object") in a network element using multiple proxy forwarders in the path to the object. A NMS may send a network management request to a first proxy forwarder according to a network management protocol (e.g., SNMP). The first proxy forwarder forwards the request to a next proxy forwarder in the path (according to a network management protocol). The last proxy forwarder finally forwards the request to the network element.

The response from the network element may then again be forwarded by the forwarders in the return direction according to the network management protocol(s). Thus, the last proxy forwarder receives a response from the network element and sends it to the next proxy forwarder. The forwarding is continued until the first proxy forwarder sends the response to the NMS.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
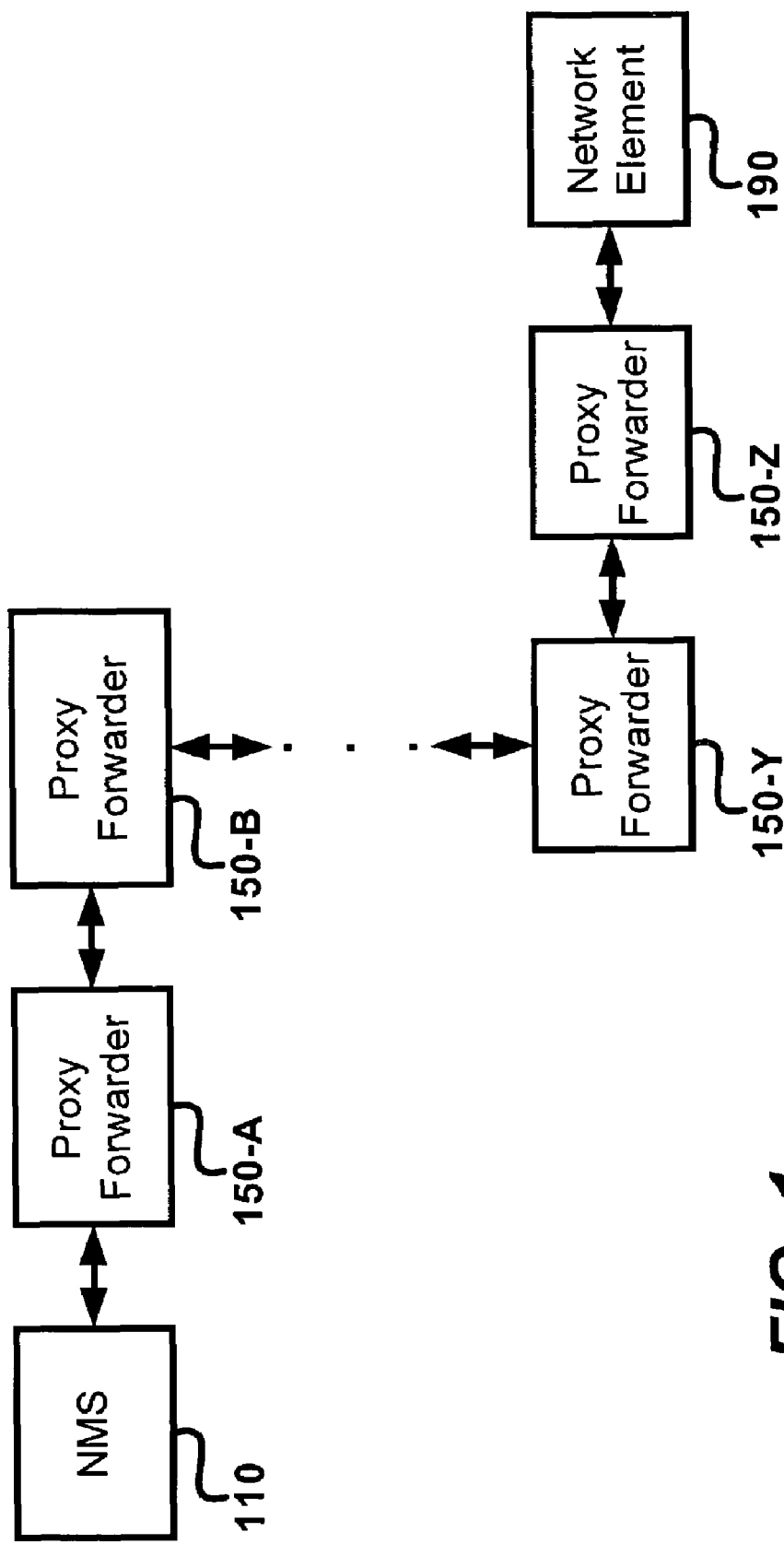
FIG. 1 is a block diagram illustrating an example environment in which the present invention can be implemented.

FIG. 1 is a block diagram illustrating an example environment in which the present invention can be implemented. The environment is shown containing network management station (NMS) 110, proxy forwarders 150-A through 150-Z, and network element 190. Each system is described in further detail below.

Network element 190 represents a system such as a router, a server or a remote access server, which contains a managed object. Network element 190 receives a network management request ("request") from proxy forwarder 150-Z and sends a response back to the same proxy forwarder 150-Z. The request relates to (e.g., get request or set request in SNMP) managed object potentially contained within network element 190. The response may be generated and sent in a known way. Only one network element is shown in FIG. 1 for conciseness. However, typical environments contain many more network elements connected to each proxy forwarder.

Network Management Station (NMS) 110 generally refers to a system from which objects in various network elements can be managed. In general, NMS 110 sends a network management request directed to network element 190 via proxy forwarder 150-A, and receives a corresponding response via the same proxy forwarder 150-A. NMS 110 may use the requests and responses as a basis for providing a suitable user interface to a network administrator.

For purpose of illustration, it is assumed that NMS 110 does not have the networking connectivity to send (and receive) packets to (from) other than proxy-forwarder 150-

A. Accordingly, the forwarding feature of the proxy forwarders may need to be used for the NMS 110 to manage network element 190. As is well known, proxy forwarders can be used even in situations when a NMS (or prior proxy forwarders in the chain) has network connectivity directly to network elements. For example, the NMS may be implemented to send requests in one version of SNMP and the managed entity/object may be implemented to operate using another version. Accordingly, a proxy forwarder may perform the necessary translation between the two version in forwarding a request PDU and a response PDU.

Proxy forwarders 150-A through 150-Z forward a request received from NMS 110 to network element 190. Similarly, proxy forwarders 150-Z through 150-A forward a response received from network element 190 to NMS 110. In general each of the request and response are received encoded in a packet. The manner in which the proxy forwarders may operate is described below in detail with reference to example embodiments.

3. Forwarding Request to/Towards a Network element

Figure 2B:
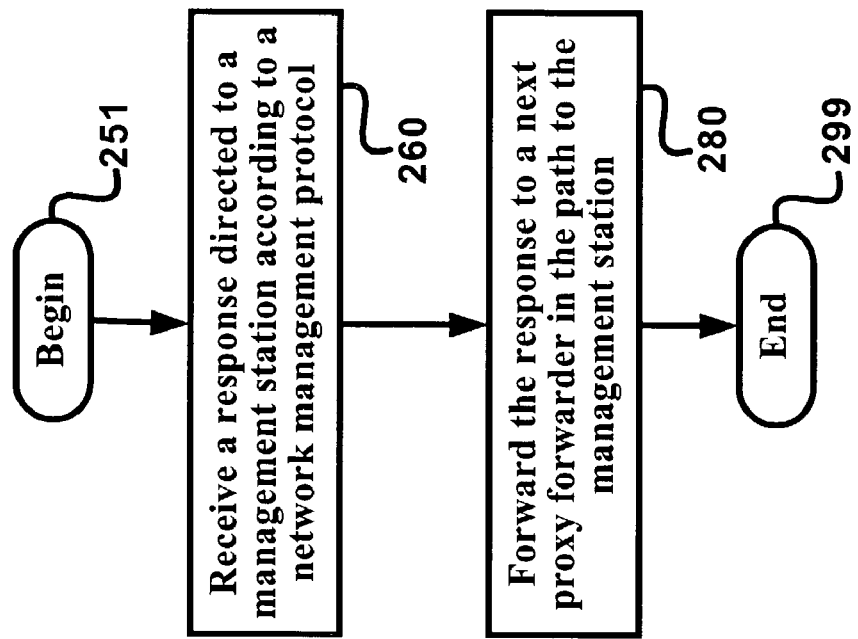
FIG. 2B is a flowchart illustrating a method using which proxy forwarders forward a response according to an aspect of the present invention.
Figure 2A:
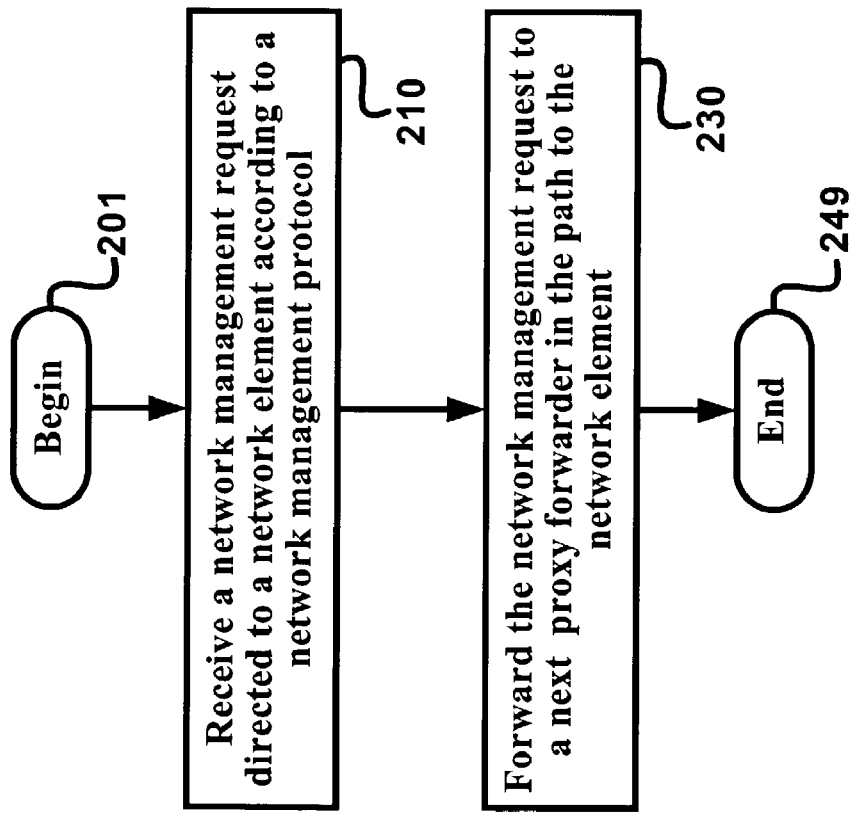
FIG. 2A is a flowchart illustrating a method using which proxy forwarders forward a request according to an aspect of the present invention.

FIG. 2A is a flowchart illustrating a method using which a proxy forwarder may forward a request to/towards a network element according to an aspect of the present invention. The flowchart is described with reference to forwarders 150-A through 150-Y of FIG. 1 for illustration. However, the invention can be implemented in other environments as well. The method begins in step 201, in which control immediately passes to step 210.

In step 210, a proxy forwarder (one of 150-A through 150-Y) receives a packet containing a network management request directed to a network element. The request is received according to a network management protocol such as SNMP. That is, the network element and other information are specified in packet portions related to the network management information. Proxy forwarder 150-A receives the request from NMS 110. The remaining proxy forwarders (150-B through 150-Y) receive the request from a previous proxy forwarder (150-A through 150-X respectively) in the path.

In step 230, the proxy forwarder (one of 150-A through 150-Y) forwards the network management request to a next proxy forwarder (150-B through 150-Z respectively) in the path to network element 190. The request is forwarded in a packet generated according to the network management protocol.

Thus, by implementing step 210 and 230, proxy forwarders 150-A through 150-Y eventually forward a request to proxy forwarder 150-Z, which in turn forwards the request to network element 190. Network element 190 may generate a response to the request. The manner in which the response is delivered to NMS 110 is described below.

4. Forwarding Response to/Towards a Management Station

FIG. 2B is a flowchart illustrating a method using which a proxy forwarder may forward a response to a management station according to an aspect of the present invention. The flowchart is described with reference to forwarders 150-Z through 150-B of FIG. 1 for illustration. However, the invention can be implemented in other environments as well. The method begins in step 251, in which control immediately passes to step 260.

In step 260, a proxy forwarder (one of 150-Z through 150-B) receives a network management response in the form of a packet directed to NMS 110. Proxy forwarder 150-Z receives the response from network element 190. The remaining proxy forwarders (150-Y through 150-B) receive the response from a previous proxy forwarder (150-Z through 150-C respectively) in the path.

In step 280, the proxy forwarder (one of 150-Z through 150-B) forwards the network management response to a next proxy forwarder (150-Y through 150-A) in the path to NMS 110. The responses are again sent in corresponding packets consistent with a network management protocol (e.g., SNMP) implemented between the proxy forwarders.

Thus, by implementing steps 260 and 280, proxy forwarders 150-Z through 150-B eventually forward a response to proxy forwarder 150-A, which in turn forwards the response to NMS 110. As noted above, the requests and responses are generated/forwarded in packets generated according to a network management protocol. An embodiment is implemented using SNMP as the network management protocol. Accordingly, some relevant concepts of SNMP are described below first in further detail.

5. SNMP as an Example Network Management Protocol

Only the concepts of Simple Network Management Protocol (SNMP) as relevant to an understanding of the example embodiments are described in detail. For further information on SNMP, the reader is referred to RFCs 1067, 2572, and 2573, available from www.ietf.org, and a book entitled, "Snmp, Snmpv2, Snmpv3, and Rmon 1 and 2" by William Stallings, ISBN Number: 0-201-48534-6, which are all incorporated in their entirety into the present application herewith.

Broadly, SNMP supports get (including get next) and set requests which respectively allow NMS 110 to retrieve information (from) and configure managed objects in network elements by sending the corresponding packets. A network element generally sends back a response upon receiving each request. Management information bases (MIB) provide a common nomenclature to identify (in both NMS and managed network elements) the specific information sought to be retrieved or configured in the network elements.

The later version(s) of SNMP (i.e., version 3) defined a single proxy forwarder for forwarding SNMP requests between a NMS and a network element (even though proxy forwarders can be implemented with other versions of SNMP). The forwarding is facilitated by the use of an engine identifier (EngineID) in each of the version 3 elements (proxy forwarders and network elements). The engine identifier uniquely identifies one of potentially many engines within a version 3 element. For simplicity it may be assumed that each version 3 element contains only one engine. Thus, each version 3 element may be assumed to have a single EngineID, hereafter referred to as 'OwnEngineID' of that specific element.

With reference to forwarding of requests from a NMS to a network element in SNMP V3, each request generated by an NMS and sent to a forwarding entity contains a ContextEngineID and AuthEngineID. A dispatcher module implemented within the forwarding entity processes a request only if the AuthEngineID in the request equals the OwnEngineID. Or else, the dispatcher module generally discards the request and sends a Report Type PDU to the NMS along with the OwnEngineID. The NMS may resend the request with AuthEngineID set to the EngineID present in the Report Type PDU.

If the AuthEngineID equals the OwnEngineID of a SNMP engine within the forwarding entity, but the ContextEngineID does not equal the OwnEngineID of the forwarder, the forwarder forwards a new packet to a next element. For simplicity, it is assumed that each forwarding entity contains only one SNMP engine, and accordingly the OwnEngineID is described as being related to the forwarding entity itself.

The next element to forward to is generally determined by SNMP-PROXY-MIB and SNMP-TARGET-MIB. The SNMP-PROXY-MIB contains an entry associated with each OwnEngineID (received as ContextEngineID), and the entry may in turn point to an entry in SNMP-TAGET-MIB. The SNMP-TARGET-MIB may specify an IP address and port number (together referred as target address) to which the packet is to be forwarded. Other MIBs such as SNMP-COMMUNITY-MIB (for versions 1 and 2 of SNMP) and SNMP-USM-MIB (for version 3 of SNMP) may be used for authentication, etc. The MIBs may be populated in a known way. Thus, the manner in which a received request is to be forwarded to a next element is determined by the content of the MIBs.

The new packet forwarded could have the same content as the received request in several respects (as described in RFC 2573 when the SNMP versions are same in receive and forward directions), but AuthEngineID in the forwarded request equals the ContextEngineID of the previously received request. In addition, the sent request may contain context information (e.g., unique request identifier) which enables the forwarder to associate a later received response with the request being sent.

Figure 3:
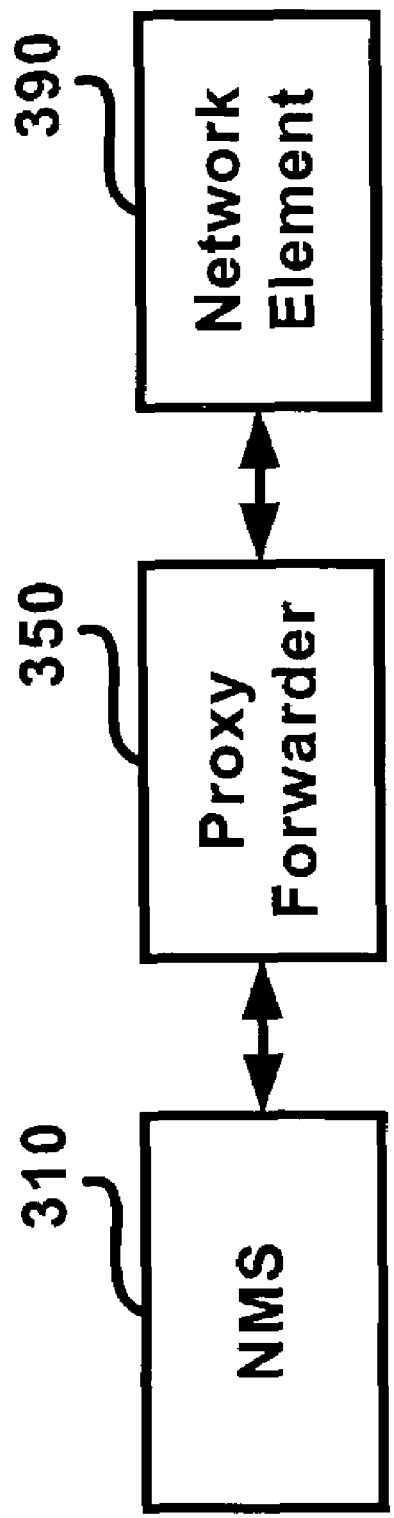
FIG. 3 is a block diagram illustrating the details of a prior art implementation of SNMP with a single proxy forwarder.

Accordingly in a prior art scenario depicted in FIG. 3, single proxy forwarder 350 is present between NMS 310 and network element 390. NMS 310 sends a request with AuthEngineID equaling the EngineID of single proxy forwarder 350 and the ContextEngineID equaling the EngineID of network element 390 (which may be configured in the NMS by an administrator). Single proxy forwarder 350 processes the request as the AuthEngineID equals OwnEngineID.

As a part of such processing, single proxy forwarder 350 creates a new packet. The new packet represents the same request (to configure or for information) as in the received request, but that the AuthEngineID in the new packet is set equal to the ContextEngineID of the received request. The new packet is forwarded to network element 390, which would find that both the AuthEngineID and the ContextEngineID equal the OwnEngineID of network element 390, and thus respond to the request. The response is forwarded back to NMS 310.

Thus, the approach of above may successfully forward a network management request from a NMS to a network element. However, the approach may fail when multiple proxy forwarders are present between an NMS and network element as described below.

6. Problem with Multiple Proxy Forwarders in the Path

For illustration, it is assumed in this section that two proxy forwarders (P1 and P2, in that sequence) are present between an NMS and a network element, and that the NMS needs to use proxy forwarder P1 to manage the network element. The proxy forwarders P1, P2 and network element are assumed to be assigned OwnEngineIDs of 1, 2, and 3 respectively. In this section, the ContextEngineID and AuthEngineID are respectively referred by the abbreviations C and A for convenience.

In such a scenario, the NMS sends a SNMP request packet to proxy forwarder P1 with AuthEngineID equaling the OwnEngineID of the first proxy forwarder and the ContextEngineID equaling the OwnEngineID of the network element (i.e., A=1 and C=3). P1 processes the SNMP request as the AuthEngineID in the SNMP request matches OwnEngineID (1). As part of the processing P1 creates a new packet with AuthEngineID set equal to the ContextEngineID of the received request (i.e., A=3 and C=3). The new packet is forwarded to the next proxy forwarder P2 in the path.

However, the AuthEngineID in the SNMP request does not match OwnEngineID of the second proxy forwarder. As a result, P2 drops the SNMP request and sends a Report Type PDU containing OwnEngineID (i.e., A=2) to P1. P1 in turn forwards the Report Type PDU to NMS. Consequently, NMS may resend the SNMP request in a new packet with ContextEngineID set equal to the EngineID of the network element (i.e., C=3) and AuthEngineID set equal to the EngineID received in the Report Type PDU (i.e., A=2).

However, AuthEngineID in the resent SNMP request packet does not match EngineID of P1. As a result, P1 drops the SNMP request packet and sends a Report Type PDU containing OwnEngineID (i.e., A=1) to NMS. Proceeding in this manner, NMS may not be able to reach the network element via multiple proxy forwarders. Thus, the manner in which a SNMP request may be forwarded to a network element via multiple proxy forwarders according to an aspect of the present invention is described below in detail.

7. Forwarding Network Management Request Via Multiple Proxy Forwarders

Figure 4:
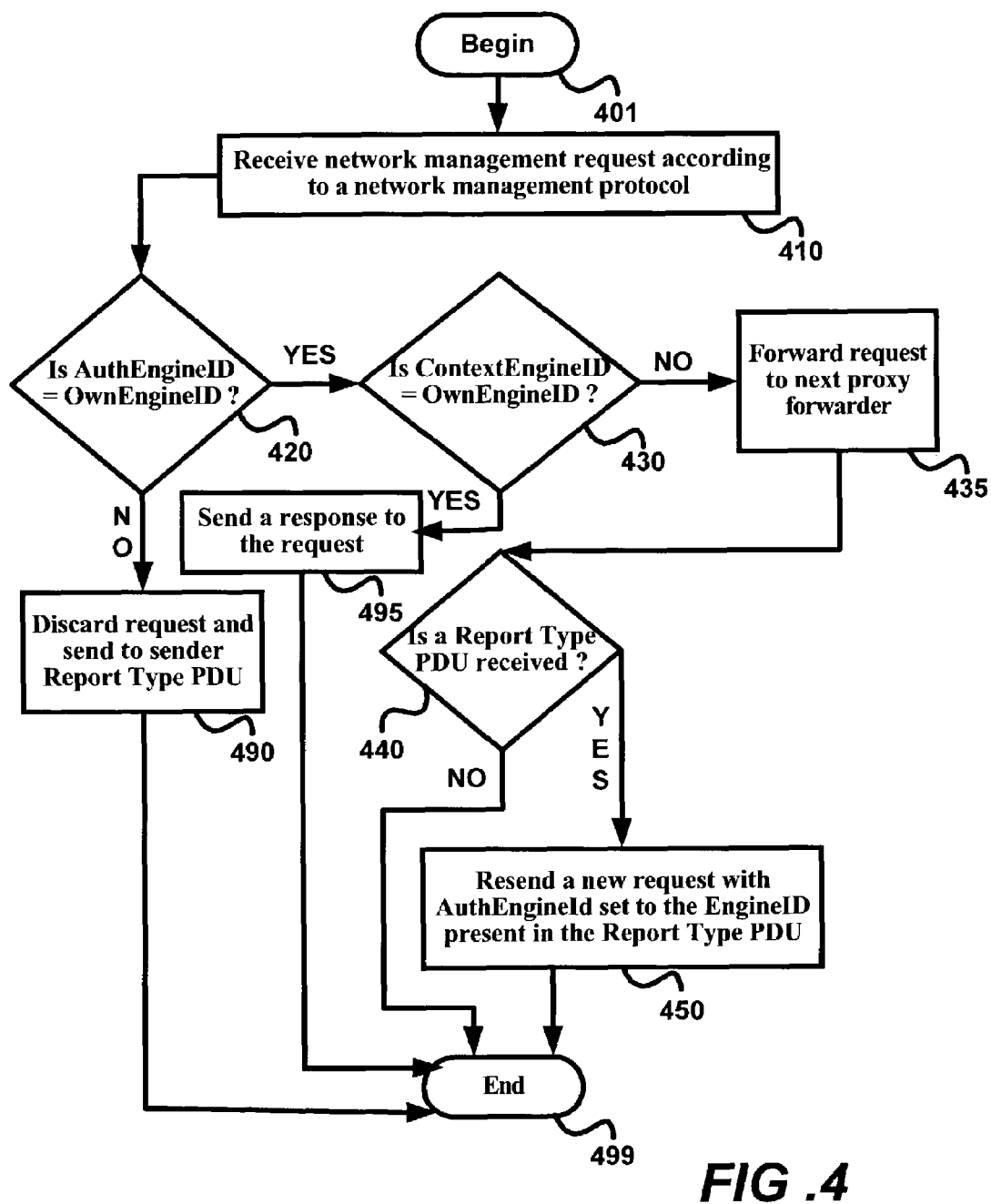
FIG. 4 is a flowchart illustrating a method using which a proxy forwarder ensures that a subsequent proxy forwarder continues to forward a request according to an aspect of the present invention.

FIG. 4 is a flowchart illustrating a method using which a proxy forwarder may forward a request to/towards a network element according to an aspect of the present invention. The flowchart is described with reference to proxy forwarder 150-A of FIG. 1 for illustration. However, the invention can be implemented with other forwarders (including 150-B through 150-Y) as well. The method begins in step 401, in which control immediately passes to step 410.

In step 410, proxy forwarder 150-A receives a network management request in a packet according to SNMP from NMS 110. The network management request contains a AuthEngineID and a ContextEngineID. The remaining proxy forwarders 150-B through 150-Y receive the request from a previous proxy forwarder in the sequence.

In step 420, proxy forwarder 150-A checks if OwnEngineID equals the AuthEngineID in the request packet. If there is a match (i.e., two identifiers are equal), control passes to step 430, or else control passes to step 490. In step 490, proxy forwarder 150-A discards the request and sends to the sender (NMS 110) a Report Type PDU packet containing OwnEngineID.

In step 430, proxy forwarder 150-A checks if OwnEngineID equals the ContextEngineID in the request packet. If there is no match, control passes to step 435, or else control passes to step 495. In step 495, a response (in the form of a packet) to the request is sent, and may be performed in a known way.

In step 435, proxy forwarder 150-A creates a new packet with AuthEngineID set equal to the ContextEngineID of the received request. The new packet is forwarded to next proxy forwarder (i.e., 150-B) in the path. Proxy forwarder 150-B may discard the new packet as the AuthEngineID does not equal OwnEngineID (of proxy forwarder 150-B). A Report Type PDU containing the OwnEngineID is sent to proxy forwarder 150-A. Accordingly, in step 440, proxy forwarder 150-A receives the Report Type PDU.

In step 450, proxy forwarder 150-A re-sends the network management request to next proxy forwarder with the AuthEngineID set equal to the EngineID present in the Report Type PDU. That is, the AuthEngineID of the resent request equals OwnEngineID of proxy forwarder 150-B. The rest of the request may contain contents similar to the new packet of step 435. As the AuthEngineID in the resent request equals OwnEngineID of proxy forwarder 150-B, the resent request may not be discarded by proxy forwarder 150-B.

Next proxy forwarder (i.e., 150-B) on receiving the network management request may follow the above described steps in forwarding the request. That is, in a first iteration a report type PDU may be received from proxy forwarder 150-C, and the engineID in the Report Type PDU may be used to resend the network management request. Proxy forwarder 150-C may then forward the resent network management request to proxy forwarder 150-D. In addition, each proxy forwarder may store locally the engineID of the next proxy forwarder after receipt of the report type PDU such that the engineID can be used in forwarding the subsequent request packets.

Thus, network management requests are eventually received by proxy forwarder 150-Z, which forwards the requests to network element 190. The response generated by network element 190 may also be forwarded back to NMS 110 by each proxy forwarder 150-Z through 150-B. The responses are forwarded back using the context information stored while forwarding the request. In other words, the response may traverse the same sequence of proxy forwarders (but in reverse direction) as the corresponding request. Thus, network management requests may be sent and received using multiple proxy forwarders according to an aspect of the present invention. The details of implementation of an embodiment of proxy forwarder are described below in further detail.

8. Proxy Forwarder

Figure 5:
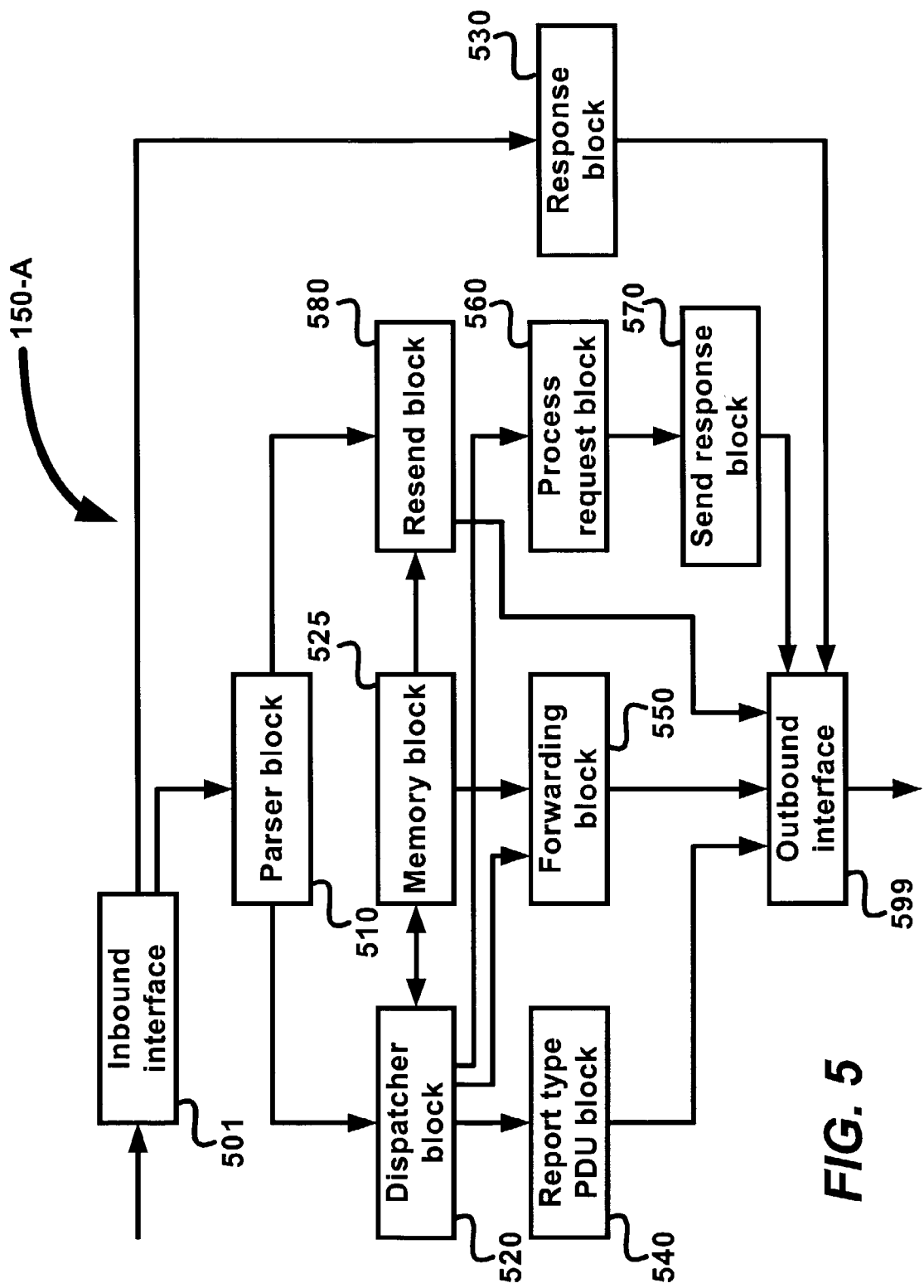
FIG. 5 is a block diagram illustrating the details of implementation of a proxy forwarder according to an aspect of the present invention.

FIG. 5 is a block diagram illustrating the details of implementation of proxy forwarder 150-A in an embodiment of the present invention. Proxy Forwarder 150-A is shown containing inbound interface 501, parser block 510, dispatcher block 520, memory 525, response block 530, report type PDU block 540, forwarding block 550, process request block 560, send response block 570, resend block 580 and outbound interface 599. Each component is described below in further detail.

Inbound interface 501 provides the physical, electrical and other protocol (e.g., IP, ATM) interfaces to receive data packets from NMS. Similarly, outbound interface 599 provides the physical, electrical and protocol interfaces to transmit data to the proxy forwarders and network elements. Inbound interface 501 and outbound interface 599 may be implemented in a known way.

Parser block 510 examines the received data packets and forwards the data to the appropriate one of the subsequent blocks based on the results of the examination. If the packets represent report PDUs, parser block 510 forwards data packets to resend block 580. If the packets represent requests (containing network management requests), parser 510 forwards data packets to dispatcher block 520. If a received packet represents a response to be forwarded, the packet may be forwarded to response block 530. Parser block 510 may also store in memory block 525 at least portions of the received requests.

Memory block 525 stores some of the information in the received requests (e.g., as specified by RFC 2753) passed by parser 510. The information enables forwarding of request and responses, and also to send report type PDUs. In addition, memory block 525 may provide temporary buffer space while processing the various requests and responses. Memory block 525 may be implemented using multiple independent units, with different units storing different pieces of information/data (requests, EngineID and forwarding information).

Dispatcher block 520 checks whether AuthEngineID in a network management request equals OwnEngineID in a request packet received from parser block 310. If the two identifiers are not equal, dispatcher block 520 passes the request to report type PDU generator 540.

However, if there is a match, dispatcher block 520 checks if ContextEngineID equals OwnEngineID. If there is a match, dispatcher block 520 passes the request to process request block 560. If there is no match, dispatcher block 520 passes the request to forwarding block 550.

Report Type PDU block 540 generates a report PDU corresponding to a request forwarded by dispatcher block 520. The report PDU contains the OwnEngineID (of the SNMP engine in proxy forwarder 150-A) retrieved from memory block 525. The report PDU is passed to outbound interface 599 for transmission back to the sender. The sender may be determined based on an IP address contained in a received packet representing a request.

Forwarding block 550 creates a new packet with substantially the same content as a received request. The received request may be provided directly by dispatcher block 520 or from memory block 525. The new packet differs from the received request packet in a few respects. AuthEngineID in the new packet may equal either the ContextEngineID (OwnEngineID of the managed element) of the previously received request or the OwnEngineID of the subsequent proxy forwarder in the path to the managed element as described below.

Forwarding block 550 may examine the PROXY-MIB and TARGET-MIB (stored in memory block 525) to determine the next entity to forward the request to. After an error PDU is received, the information stored in memory block 525 may be extended to contain the OwnEngineID of the subsequent proxy forwarder (received in an error PDU). The extended information may indicate that requests with a specific ContextEngineID should be forwarded with a AuthEngineID equaling the OwnEngineID of the subsequent proxy forwarder.

Thus, from the second request onwards, packets may be forwarded with AuthEngineID equaling OwnEngineID of proxy forwarder 150-B, causing proxy forwarder 150-B to further forward the request. In addition, forwarding block 550 may create a unique identifier associated with the forwarded request, which can be used to identify the associated response which would be received later. Similarly, the received request may also contain a unique identifier, which is used in forwarding the corresponding response. The two identifiers may be stored in memory block 525.

Process request block 560 receives a request in case the ContextEngineID in the request matches OwnEngineID. Process request block 560 processes the request to generate the content for a response. The generated content is passed to send response block 570, which constructs a response and passes the response to NMS 110 via outbound interface 599.

Resend block 580 receives a report type PDU from a subsequent proxy forwarder which indicates that an error had occurred in the further forwarding of the network management request. Resend block 580 re-creates another request using the content related to the previously received request present/stored in memory block 525. However, the AuthEngineID of the another request is set equal to the EngineID present in report type PDU. Resend block 580 passes the request to outbound interface 599 for forwarding to the next proxy forwarder (150-B).

As described above, due to the use of the engineID in the report type PDU as the AuthEngineID, the next proxy forwarder 150-B would forward the network management request to a later one in the sequence of proxy forwarders.

Response block 530 examines the content of a received response to determine the matching request forwarded earlier. The determination may be made based on a unique identifier (stored in memory block 525) generated and sent in the corresponding forwarded request. Response block 530 forwards back the response to a previous network element (here NMS 110) using a unique identifier present in the earlier received request. Forwarding of responses is described in further detail in RFC 2573, incorporated in its entirety herewith.

It should be understood that different components of a proxy forwarder can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing proxy forwarder with a desired mix of hardware, software and/or firmware. An embodiment implemented substantially in software is described below.

9. Software Implementation

Figure 6:
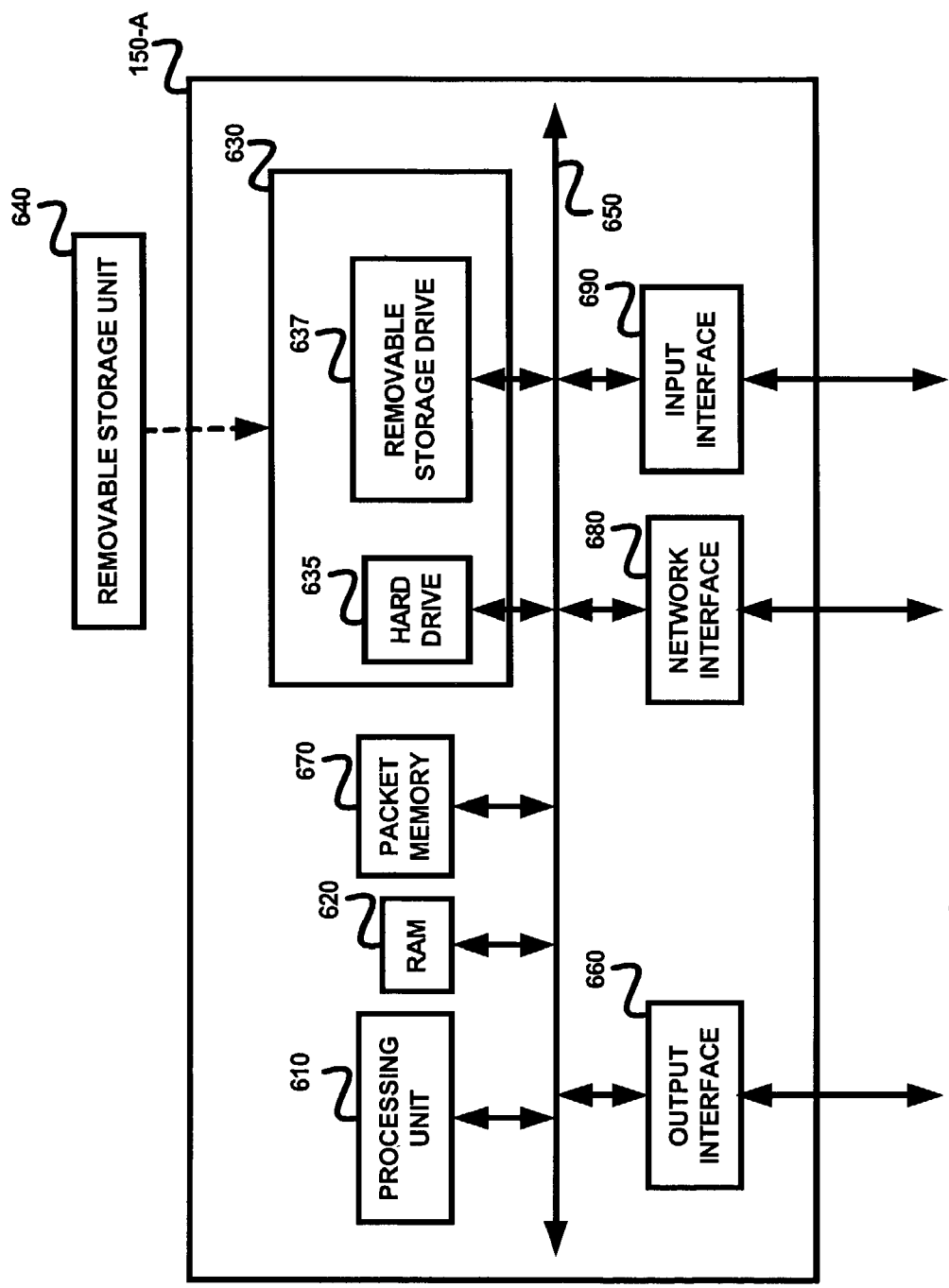
FIG. 6 is a block diagram illustrating the details of implementation of a proxy forwarder substantially in the form of software.

FIG. 6 is a block diagram illustrating the details of proxy forwarder 150-A in one embodiment. Proxy Forwarder 150-A is shown containing processing unit 610, random access memory (RAM) 620, storage 630, output interface 660, datagram memory 670, network interface 680 and input interface 690. Each block is described in further detail below.

Output interface 660 provides output signals (e.g., display signals to a display unit, not shown) which can form the basis for a suitable interface for an administrator to interact with proxy forwarder 150-A. Input interface 690 (e.g., interface with a key-board and/or mouse, not shown) enables a user/administrator to provide any necessary inputs to proxy forwarder 150-A.

Network interface 680 may enable proxy forwarder 150-A to send and receive data on communication networks using protocols such as ATM and IP. Network interface 680, output interface 660 and input interface 690 may be implemented in a known way.

RAM 620, storage 630, and datagram memory 670 may together be referred to as a memory. RAM 620 receives instructions and data on path 650 from storage 630, and provides the instructions to processing unit 610 for execution. Datagram memory 670 stores (queues) datagrams/cells waiting to be forwarded (or otherwise processed) on different ports.

Secondary memory 630 may contain units such as hard drive 635 and removable storage drive 637. Secondary storage 630 may store the software instructions and data, which enable Proxy forwarder 150-A to provide several features in accordance with the present invention. While secondary memory 630 is shown contained within proxy forwarder 150-A, an alternative embodiment may be implemented with the secondary memory implemented external to proxy forwarder 150-A, and the software instructions (described below) may be provided using network interface 680.

Some or all of the data and instructions may be provided on removable storage unit 640 (or from a network using protocols such as Internet Protocol), and the data and instructions may be read and provided by removable storage drive 637 to processing unit 610. Floppy drive, magnetic tape drive, CD-ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for memory/queue management). The special purpose processors may also be provided instructions from RAM 620.

In general, processing unit 610 reads sequences of instructions from various types of memory medium (including RAM 620, storage 630 and removable storage unit 640), and executes the instructions to provide several features of the present invention. Such memory medium represents a computer readable medium from which processors can read and execute the instruction several features of the present invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A networking environment comprising:
   a network element containing a managed object;
   a network management station (NMS) generating a request specifying an element in said managed object;
   a first proxy forwarder receiving a first packet containing said request according to a network management protocol from said NMS, wherein said request specifies an operation on said managed object, wherein said network management protocol comprises simple network management protocol (SNMP); and
   a last proxy forwarder receiving said request from said first proxy forwarder according to said network management protocol and forwarding said request to said network element in a last packet,
   wherein said network element receives said request from said last proxy forwarder and performs said request on said managed object to generate a response to said request,
   wherein said first packet specifies an AuthEngineID equaling an OwnEngineID of said first proxy forwarder and a ContextEngineID equaling an OwnEngineID of said network element, wherein said first proxy forwarder sends said request in a second packet to a third proxy forwarder, said second packet specifying a AuthEngineID equaling said OwnEngineID of said network element, wherein said first proxy forwarder receives from said third proxy forwarder a error PDU containing an OwnEngineID of said third proxy forwarder, said first proxy forwarder re-sending said request in a third packet to said third proxy forwarder, wherein said third packet contains an AuthEngineID equaling said OwnEngineID of said third proxy forwarder.

2. The networking environment of claim 1, wherein said third proxy forwarder comprises said last proxy forwarder, and only said last proxy forwarder and said first proxy forwarder are present between said NMS and said network element.

3. The networking environment of claim 2, wherein said network management protocol comprises version 3 of SNMP.

4. A proxy forwarder for processing requests generated by a network management station (NMS) and directed to a network element, said proxy forwarder comprising:

an inbound interface receiving a first packet containing a request according to a network management protocol from said NMS, wherein said request specifies an operation on a managed object contained in said network element, wherein said network management protocol comprises simple network management protocol (SNMP);

an outbound interface;

a memory for storing data indicating that said request is to be forwarded to another proxy forwarder according to said network management protocol;

a forwarding block coupled to said memory, said forwarding block generating a second packet containing said request and causing said outbound interface to forward said second packet to said another proxy forwarder according to said data stored in said memory, wherein said network element receives said request via said another proxy forwarder and performs said request on said managed object to generate a response to said request, wherein said first packet specifies an AuthEngineID equaling an OwnEngineID of said proxy forwarder and a ContextEngineID equaling an OwnEngineID of said network element, wherein said second packet specifies an AuthEngineID equaling said OwnEngineID of said network element;

a parser block coupled to said inbound interface and receiving from said another proxy forwarder an error PDU containing an OwnEngineID of said another proxy forwarder; and a resend block re-sending said request in a third packet to said another proxy forwarder, wherein said third packet contains an AuthEngineID equaling said OwnEngineID of said another proxy forwarder.

5. The proxy forwarder of claim 4, wherein said memory stores data indicating that said OwnEngineID of said another forwarder is to be used for AuthEngineID when forwarding future packets.

6. The proxy forwarder of claim 4, further comprises an engine identifier check block determining whether AuthEngineID in said first packet equals said OwnEngineID of said proxy forwarder, wherein said engine identifier block discards packets with AuthEngineID not equaling said OwnEngineID of said proxy forwarder.

7. The proxy forwarder of claim 6, further comprises a report type PDU block sending a report type PDU corresponding to each of the packets discarded by said engine identifier block.

8. The proxy forwarder of claim 6, wherein said engine identifier check block stores a portion of said first packet in said memory such that said resend block can generate said third packet based on said portion.

9. The proxy forwarder of claim 8, wherein said forwarding block stores a unique identifier associated with said request in said memory, wherein said proxy forwarder further comprises a response block receiving said response to said request, wherein said response block uses said unique identifier in said memory to identify that said response is related to said request, said response block using said portion stored in said memory to forward said response to a source proxy forwarder sending said first packet to said proxy forwarder.

10. The proxy forwarder of claim 6, wherein said proxy forwarder further comprises:

a process request block determining whether said ContextEngineID in a third packet equals said OwnEngineID of said proxy forwarder; and a send response block processing a request specified by said third packet performing an operation specified by said third packet, and generating a response corresponding to said request in said third packet.

11. The proxy forwarder of claim 4, wherein said operation comprises a get operation or a set operation, and wherein said network management protocol comprises version 3 of SNMP.

12. A proxy forwarder for processing requests generated by a network management station (NMS) and directed to a network element, said proxy forwarder comprising:

means for receiving a first packet containing a request according to a network management protocol from said NMS, wherein said request specifies an operation on a managed object contained in said network element, wherein said network management protocol comprises simple network management protocol (SNMP);

means for storing data indicating that said request is to be forwarded to another proxy forwarder according to said network management protocol;

means for forwarding a second packet containing said request and causing said outbound interface to forward said second packet to said another proxy forwarder according to said data stored in said memory, wherein said network element receives said request via said another proxy forwarder and performs said request on said managed object to generate a response to said request, wherein said first packet specifies an AuthEngineID equaling an OwnEngineID of said proxy forwarder and a ContextEngineID equaling an OwnEngineID of said network element, wherein said second packet specifies an AuthEngineID equaling said OwnEngineID of said network element, means for receiving from said another proxy forwarder an error PDU containing an OwnEngineID of said another proxy forwarder; and means for re-sending said request in a third packet to said another proxy forwarder, wherein said third packet contains an AuthEngineID equaling said OwnEngineID of said another proxy forwarder.

13. The proxy forwarder of claim 12, wherein said memory stores data indicating that said OwnEngineID of said another forwarder is to be used for AuthEngineID when forwarding future packets.

14. The proxy forwarder of claim 12, further comprises means for determining whether AuthEngineID in said first packet equals said OwnEngineID of said proxy forwarder, wherein said engine identifier block discards packets with AuthEngineID not equaling said OwnEngineID of said proxy forwarder.

15. The proxy forwarder of claim 14, further comprises means for sending a report type PDU corresponding to each of the packets discarded by said engine identifier block.

16. The proxy forwarder of claim 14, wherein said means for determining stores a portion of said first packet in said memory such that said resend block can generate said third packet based on said portion.

17. The proxy forwarder of claim 16, wherein said means for forwarding stores a unique identifier associated with said request in said memory, wherein said proxy forwarder further comprises means for receiving a response to said request, wherein said means for receiving a response uses said unique identifier in said memory to identify that said response is related to said request, said means for receiving a response using said portion stored in said memory to forward said response to a source proxy forwarder sending said first packet to said proxy forwarder.

18. The proxy forwarder of claim 14, wherein said proxy forwarder further comprises:
means for determining whether said ContextEngineID in a third packet equals said OwnEngineID of said proxy forwarder; and
means for processing a request specified by said third packet performing an operation specified by said third packet, and generating a response corresponding to said request in said third packet.

19. The proxy forwarder of claim 12, wherein said operation comprises a get operation or a set operation, and wherein said network management protocol comprises version 3 of SNMP.

20. A computer readable medium storing one or more sequences of instructions for causing a proxy forwarder to process requests generated by a network management station (NMS) and directed to a network element, wherein execution of said one or more sequences of instructions by one or more processors contained in said proxy forwarder causes said one or more processors to perform the actions of:
storing in a memory data indicating whether packets are to be forwarded according to a network management protocol, wherein said network management protocol comprises simple network management protocol (SNMP);
receiving a first packet containing a request according to said network management protocol, wherein said request specifies an operation on a managed object contained in said network element; and
forwarding a second packet containing said request to an another proxy forwarder according to said data stored in said memory,
wherein said network element receives said request via said another proxy forwarder and performs said request on said managed object to generate a response to said request,
wherein said first packet specifies an AuthEngineID equaling an OwnEngineID of said proxy forwarder and a ContextEngineID equaling an OwnEngineID of said network element, wherein said second packet specifies an AuthEngineID equaling said OwnEngineID of said network element, further comprises:
receiving from said another proxy forwarder an error PDU containing an OwnEngineID of said another proxy forwarder; and
re-sending said request in a third packet to said another proxy forwarder, wherein said third packet contains an AuthEngineID equaling said OwnEngineID of said another proxy forwarder.

21. The computer readable medium of claim 20, said memory stores data indicating that said OwnEngineID of said another forwarder is to be used for AuthEngineID when forwarding future packets.

22. The computer readable medium of claim 20, further comprises:
determining whether AuthEngineID in said first packet equals said OwnEngineID of said proxy forwarder; and
discarding packets with AuthEngineID not equaling said OwnEngineID of said proxy forwarder.

23. The computer readable medium of claim 22, further comprises sending a report type PDU corresponding to each of the packets discarded by said engine identifier block.

24. The computer readable medium of claim 22, further comprises storing a portion of said first packet in said memory such that said re-sending can generate said third packet based on said portion.

25. The computer readable medium of claim 24, further comprising:
storing a unique identifier associated with said request in said memory;
receiving a response to said request, wherein said unique identifier in said memory is used to identify that said response is related to said request.

26. The computer readable medium of claim 22, further comprises:
determining whether said ContextEngineID in a third packet equals said OwnEngineID of said proxy forwarder; and
processing a request specified by said third packet performing an operation specified by said third packet, and generating a response corresponding to said request in said third packet.

27. The computer readable medium of claim 20, wherein said operation comprises a get operation or a set operation, and wherein said network management protocol comprises version 3 of SNMP.

28. A method of processing requests generated by a network management station (NMS) and directed to a network element, said method being performed in a proxy forwarder, said method comprising:
storing in a memory data indicating whether packets are to be forwarded according to a network management protocol;
receiving a first packet containing a request according to said network management protocol, wherein said request specifies an operation on a managed object contained in a network element, wherein said network management protocol comprises simple network management protocol (SNMP); and
forwarding a second packet containing said request to an another proxy forwarder according to said data stored in said memory,
wherein said network element receives said request via said another proxy forwarder and performs said request on said managed object to generate a response to said request, wherein said first packet specifies an AuthEngineID equaling an OwnEngineID of said proxy forwarder and a ContextEngineID equaling an OwnEngineID of said network element, wherein said second packet specifies an AuthEngineID equaling said OwnEngineID of said network element;

receiving from said another proxy forwarder an error PDU containing an OwnEngineID of said another proxy forwarder; and re-sending said request in a third packet to said another proxy forwarder, wherein said third packet contains an AuthEngineID equaling said OwnEngineID of said another proxy forwarder.

29. The method of claim 28, said memory stores data indicating that said OwnEngineID of said another forwarder is to be used for AuthEngineID when forwarding future packets.

30. The method of claim 28, further comprises:
determining whether AuthEngineID in said first packet equals said OwnEngineID of said proxy forwarder; and
discarding packets with AuthEngineID not equaling said OwnEngineID of said proxy forwarder.

31. The method of claim 30, further comprises sending a report type PDU corresponding to each of the packets discarded by said engine identifier block.

32. The method of claim 30, further comprises storing a portion of said first packet in said memory such that said resending can generate said third packet based on said portion.

33. The method of claim 32, further comprising:
storing a unique identifier associated with said request in said memory;
receiving a response to said request, wherein said unique identifier in said memory is used to identify that said response is related to said request.

34. The method of claim 30, further comprises:
determining whether said ContextEngineID in a third packet equals said OwnEngineID of said proxy forwarder; and processing a request specified by said third packet performing an operation specified by said third packet, and generating a response corresponding to said request in said third packet.

35. The method of claim 28, wherein said operation comprises a get operation or a set operation, and wherein said network management protocol comprises version 3 of SNMP.

36. A computer readable medium storing one or more sequences of instructions for causing a proxy forwarder to support management of a managed element, wherein another proxy forwarder is present in a path from said proxy forwarder to said managed element, wherein execution of said one or more sequences of instructions by one or more processors contained in said proxy forwarder causes said one or more processors to perform the actions of:

storing in a memory data indicating whether packets are to be forwarded according to a network management protocol;

receiving a first packet containing a request according to said network management protocol, wherein said request specifies an operation on a managed object contained in a network element, wherein said first packet specifies an AuthEngineID equaling an OwnEngineID of said proxy forwarder and a ContextEngineID equaling an OwnEngineID of said network element;

forwarding a second packet containing said request to said another proxy forwarder according to said data stored in said memory, wherein said second packet contains an AuthEngineID equaling said OwnEngineID of said another proxy forwarder and said ContextEngineID equaling the OwnEngineID of said network element.

37. The computer readable medium of claim 36, wherein said network management protocol comprises simple network management protocol.

* * * * *